F. A. SMITH.
VEHICLE.
APPLICATION FILED FEB. 10, 1920.
1,419,475.
Patented June 13, 1922.
2 SHEETS—SHEET 2.
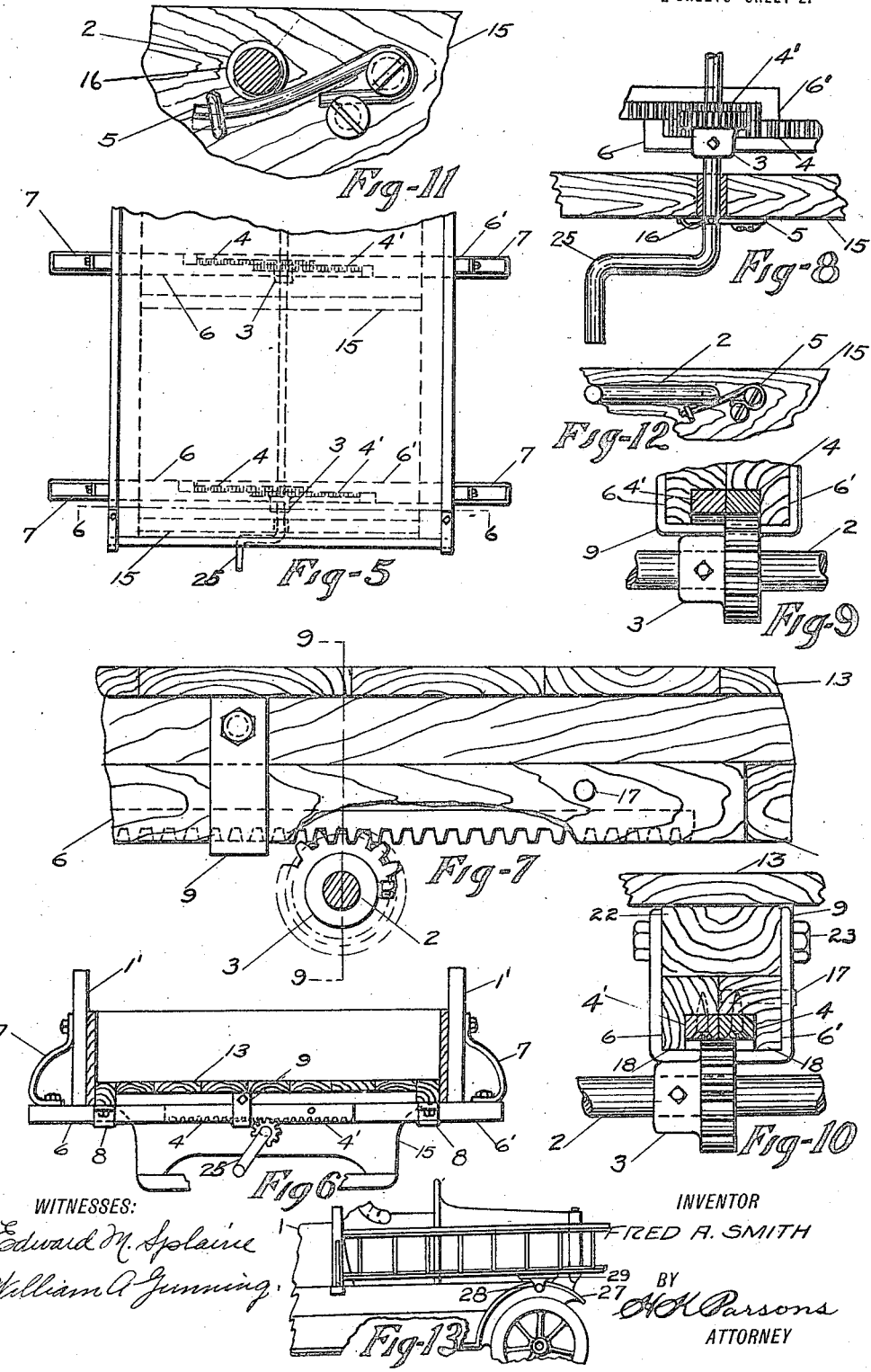
WITNESSES:
Edward M. Splaine
William A. Jinning
INVENTOR
FRED A. SMITH
BY
A. H. Parsons
ATTORNEY

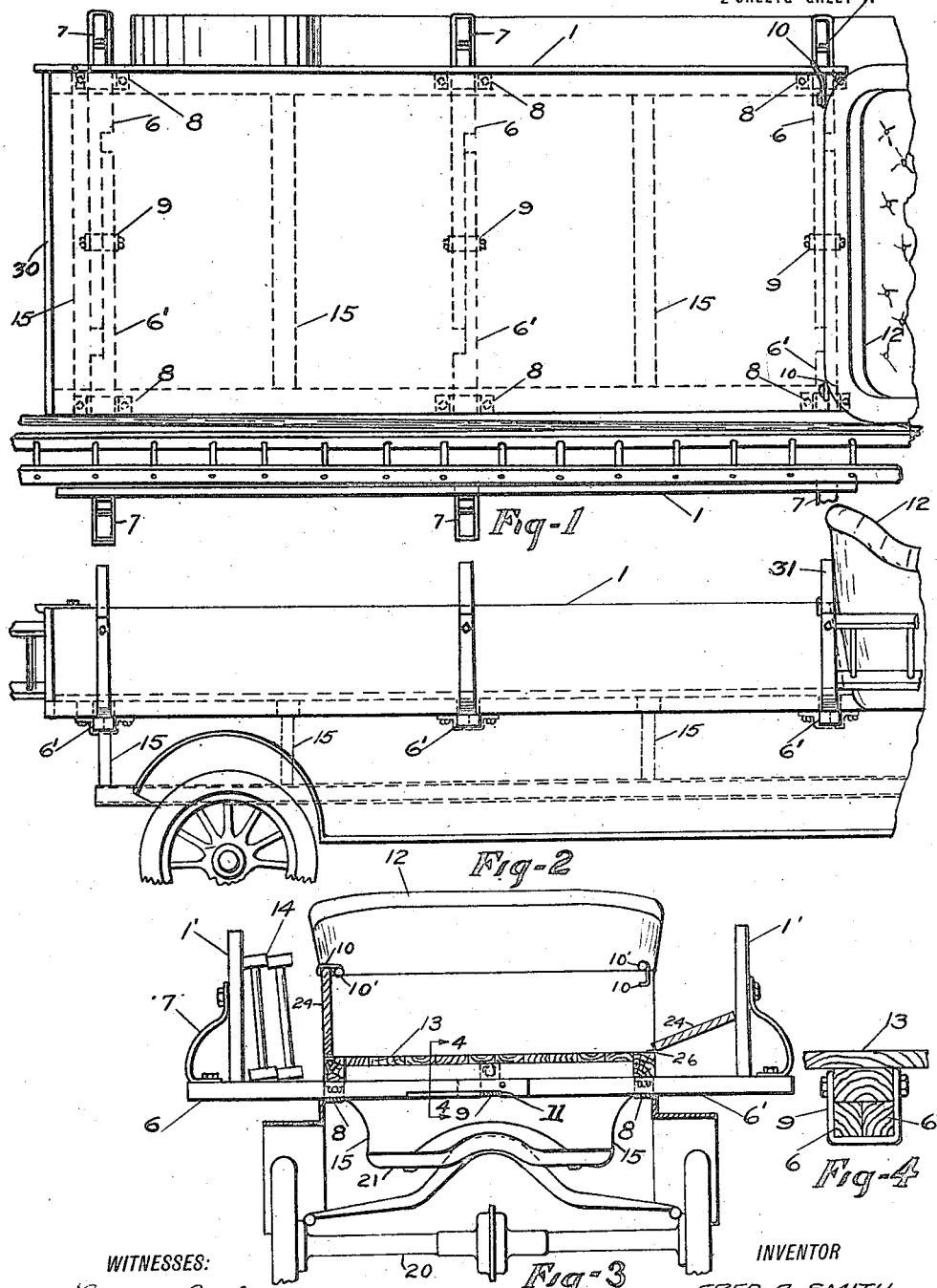

UNITED STATES PATENT OFFICE.

FRED AUGUSTUS SMITH, OF MEDFIELD, MASSACHUSETTS.

VEHICLE.

1,419,475.          Specification of Letters Patent.   Patented June 13, 1922.

Application filed February 10, 1920. Serial No. 357,524.

*To all whom it may concern:*

Be it known that I, FRED A. SMITH, a citizen of the United States, residing at Medfield, in the county of Norfolk and State of Massachusetts, have invented certain new and useful Improvements in Vehicles, of which the following is a specification.

This invention relates to improvements in vehicles and has particular reference to a new and improved construction of adjustable body for use in connection therewith.

It is therefore one of the principal objects of my present invention to provide a novel and improved form of body construction which will make it possible to adjust the load to more nearly balance over the four wheels, which will greatly reduce the amount that a long article will project from the rear of the vehicle, and which will make it possible to use light converted autos for the delivery of such articles in place of large and heavy specially constructed trucks.

A further object of the present invention is the provision of an improved form of vehicle body which may be adjusted according to the load to be carried to accommodate either small articles or extra long ones as desired.

Another object of the invention is the provision of an adjustable body which may be enlarged for transportation purposes but may be readily contracted to enable the machine to be stored in minimum space.

Other objects and advantages of my improved construction should be readily apparent by reference to the following specification taken in connection with the accompanying drawings forming a part thereof, and it will be understood that I may make any modifications in the details of construction shown and described within the scope of the appended claims without departing from or exceeding the spirit of my invention.

Figure 1 represents a plan view of a vehicle body embodying my improvements.

Figure 2 represents a side elevation thereof.

Figure 3 represents an end view with parts shown in extended position.

Figure 4 illustrates a detail sectional view of the slides and guide stirrup.

Figure 5 is a fragmentary plan view with parts indicated in dotted lines.

Figure 6 is a sectional view on the line 6—6 of Figure 5.

Figure 7 represents a fragmentary enlarged view of parts shown in Figure 6.

Figure 8 represents a fragmentary bottom plan view of the adjusting means.

Figure 9 represents a section as on the line 9—9 of Figure 7.

Figure 10 represents a view similar to Figure 9 illustrating a different adjustment of the shifting mechanism.

Figure 11 represents an enlarged view of the locking device.

Figure 12 is another view thereof.

Figure 13 is a fragmentary side elevation.

In the drawings, in which similar characters of reference are employed to denote corresponding parts throughout the several views, the numeral 20 designates the running gear of a suitable light automobile on which is supported the usual frame 21 having secured to it the plurality of supports 15 for the truck bed 13 which may be of any desired construction, but preferably includes the cross-beams 22. These beams 22 have depending therefrom the guide stirrups 9 secured in position by the bolts 23 and have sliding therethrough the extension bars 6 and 6' which carry the standards 1' for the sides 1 of the bed or truck body.

In the form of invention particularly illustrated in Figure 1 I have shown these sides as normally held inward by the hook-like latch members 10 which if desired may be the sole means employed to control the expansion of the sides of the body, the sides in that event when released being moved in or out by hand. For ease of operation however, as well as to facilitate intermediate adjustments and secure one or both sides extended any desired amount, I preferably make use of a rack and pinion shift mechanism such as indicated in dotted lines in Figure 5 and illustrated in detail in the adjacent views.

This mechanism includes a rack 4' carried by the bar 6 and an overlaping rack portion 4 carried by the bar 6', and a pinion 3 on the operating shaft 2 having the crank 25 for rotation thereof. It is to be understood that the shaft 2 will extend lengthwise of the bed of the truck and preferably be provided with a plurality of pinions to mesh with a corresponding number of sets of racks so that the lateral adjustment of the sides may be readily accomplished without danger of binding or sticking of the parts.

By reference Figures 8, 9 and 10 of the drawings it will be seen that the pinion may be brought by longitudinal shifting of the shaft 2 to mesh with either the rack 4 or 4' as desired and when in such position will serve on turning of the crank 25 to give the desired adjustment to that side of the bed. On the other hand, the pinion may be so positioned, as shown in Figure 10 as to be half in mesh with each rack, in which position relative shifting of the two sides is prevented and they are locked together in definite adjusted relation. A spring latch 5 carried by the end member 15 and engaging the groove 16 in the shaft 2 serves to retain the shaft with its pinions in this locking position though automatically snapping out to permit of lengthwise shifting of the shaft on pressure against the crank 25.

It is to be understood that the primary purpose of the present invention is to provide means by which the body of the truck may be adjusted laterally for long articles so that such articles may be carried in the truck but extending forward along the side of the driver's seat and windshield and if need be project beyond the radiator at the front, balancing the article on the machine and greatly reducing the over-all length of the loaded truck. It will be understood that at times all that is required is supports for the articles to be carried such as would be provided by the bars 6 and 6', while at other times it would be preferable to have a bottom for the extension. To accomplish this result I preferably hinge or secure in position as at 26 the supplemental side board 24 which when the side is extended may be either held in closed position as by the latch or other fastener 10' when a ladder rack is desired as shown in Figure 3 or may be allowed to swing outward as shown on the right hand side in said figure, it being understood that when the side is extended the full amount said supplemental side board will drop down and form a flat bottom for the extended side.

While the amount of opening movement of the sides may be varied within limits, to prevent undue opening thereof I preferably provide suitable stops near the ends of the bars 6 and 6' which may be in the form of the lugs 11 shown in Figure 3 to engage the center stirrup 9, or suitable stops such as the transverse bolts or pins 17 shown in Figures 6, 7 and 10 for operation in the same manner.

From the foregoing description taken in connection with the drawings it will be seen that I have provided a novel and improved construction of vehicle body particularly adapted for use on light automobile trucks in which one or both sides may be extended as desired to provide carrying racks or body portions outside the side lines of the vehicle so that long articles may be carried projecting beyond the driver to the front of the machine, thus balancing the weight of said articles and making it possible to handle the vehicle in crowded traffic and under conditions where the same truck loaded in the usual manner could not be employed.

It will further be noted that by my improved construction a temporarily wide closed body truck may be be provided having a considerably increased carrying capacity but which when not in use may be closed up to permit of the truck being stored in a standard width of garage stall and which will thus practically double the utility of the truck, enabling it to do the work of much larger and more expensive ones without appreciable increase of initial cost and no change in storage costs.

It will be apparent by reference to Figures 3 and 13 that the height of the extensible side sections is such as to just clear the fenders or mud guards of the vehicle and carry the load thereabove. If desired, however, to aid in steadying long articles, the front fender may be provided with a supplemental bracket or arm 28 either secured to the frame alone or to the frame and to the fender 27 and carrying the rest 29 on which a ladder, plank or the like may rest at its front end at the side of the engine hood, as shown in Figure 13.

I would invite particular attention to the fact that while I have shown my improvement as employed in connection with an ordinary type of open body that on account of the independent connection of the extensible members and the body proper it is equally applicable in the case of closed bodies when the extensions will provide extra carrying spaces at the sides of the covered or closed bodies and thus be particularly desirable for the use of dry goods or general merchandise stores handling in the main small packages but at times having extra long articles to deliver. In this connection I would mention that the main body section may also be somewhat extended in length in that the floor of the body section projects rearwardly beyond the end gate 30 as at 31 so that when the end gate is released as the sides are extended the gate in place of dropping down will rest on the portion 31 and projecting rearwardly increasing the total length of the main body portion.

I claim:—

1. A device of the character described, including overlapping laterally adjustable bars carrying rack portions, a pinion for selective engagement with the racks to independently laterally adjust said bars, shifting means for the pinion, and a resilient locking device for securing the pinion in intermediate position to lock the bars against relative movement.

2. A vehicle body including a center section and a pair of laterally adjustable side sections, said side sections having supports including overlapping rack portions, and a single pinion for joint or selective engagement with the rack portions to control the position of the side sections.

3. In a vehicle body, the combination with a center section and laterally adjustable side sections having overlapping rack portions, of a rotatable shaft shiftable transversely of the racks, and a pinion on the shaft selectively meshable with the racks by shifting of the shaft.

4. In a vehicle body, the combination with a center section and laterally adjustable side sections having overlapping rack portions, of a rotatable shaft shiftable transversely of the racks, and a pinion on the shaft selectively meshable with either or both racks by shifting of the shaft.

5. In a vehicle body, the combination with a center section and laterally adjustable side sections having supports including overlapping rack portions, of a rotatable shaft shiftable transversely of the racks, a pinion on the shaft selectively meshable with either or both racks by shifting of the shaft, and means for locking the shaft against endwise movement.

In testimony whereof I have affixed my signature, in presence of two witnesses.

FRED AUGUSTUS SMITH.

Witnesses:
LEWIS K. CONANT,
PATRICK H. LEAHY.